J. FOUNTAIN, Jr.
UNIVERSAL FLOOR BOX FOR THE DISTRIBUTION OF ELECTRIC WIRES.
APPLICATION FILED JUNE 24, 1904. RENEWED MAR. 31, 1910.
974,370.
Patented Nov. 1, 1910.
3 SHEETS—SHEET 1.
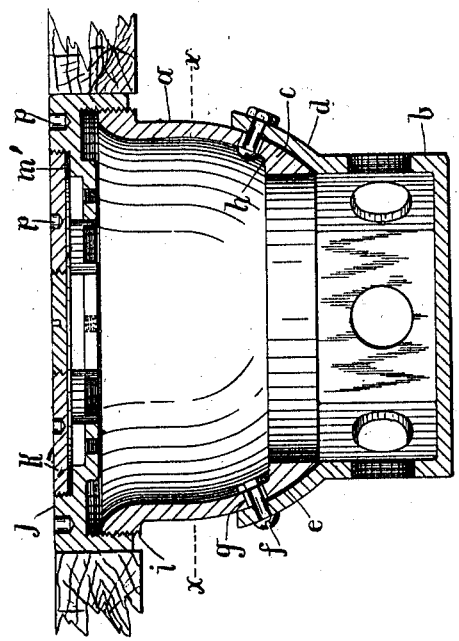
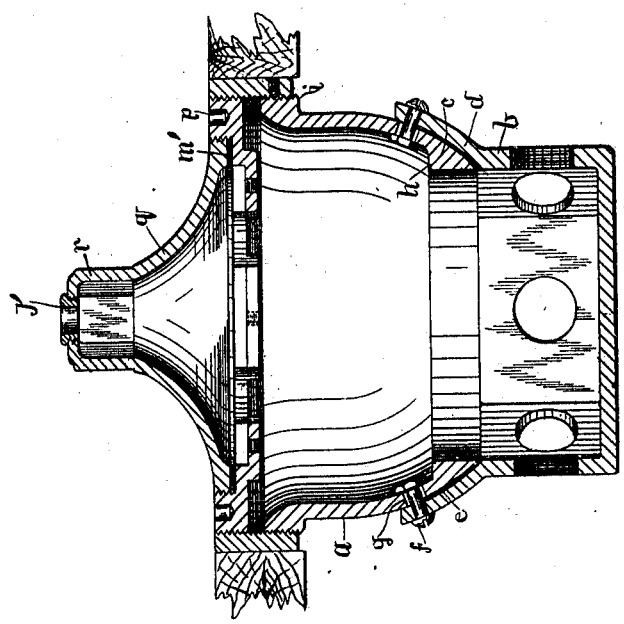

J. FOUNTAIN, Jr.
UNIVERSAL FLOOR BOX FOR THE DISTRIBUTION OF ELECTRIC WIRES.
APPLICATION FILED JUNE 24, 1904. RENEWED MAR. 31, 1910.
974,370.
Patented Nov. 1, 1910.
3 SHEETS—SHEET 2.
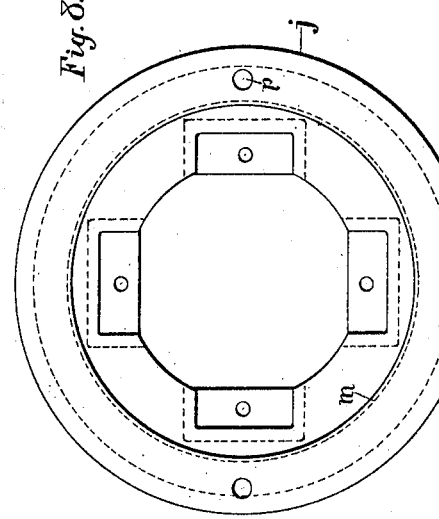
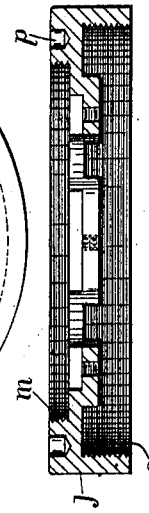
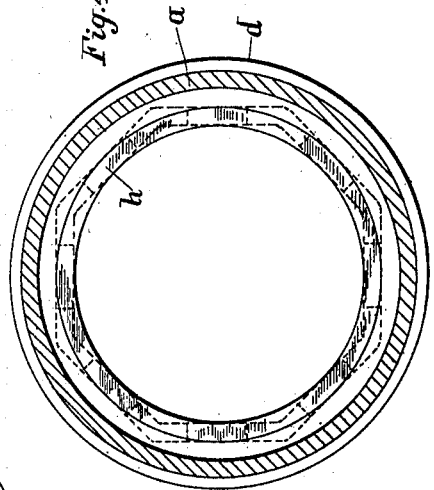
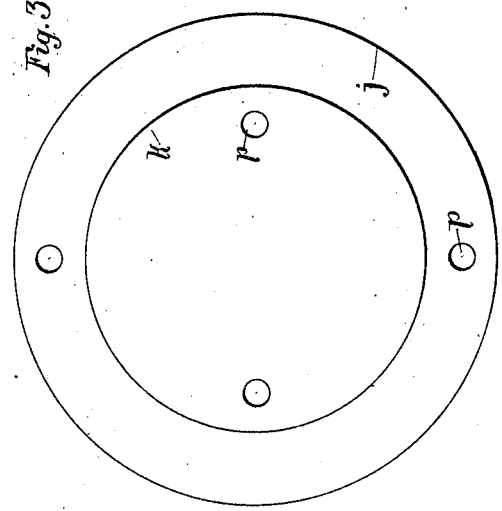
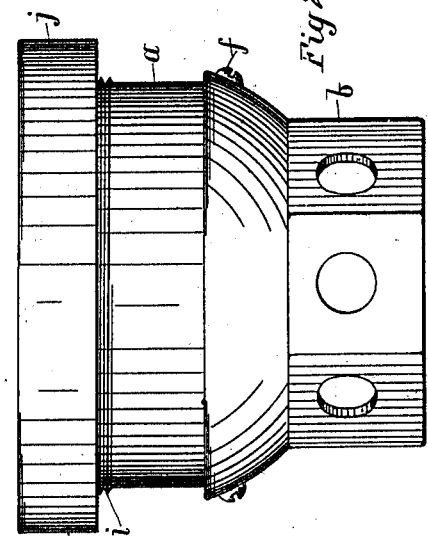
WITNESSES:
INVENTOR
ATTORNEYS.

J. FOUNTAIN, Jr.
UNIVERSAL FLOOR BOX FOR THE DISTRIBUTION OF ELECTRIC WIRES.
APPLICATION FILED JUNE 24, 1904. RENEWED MAR. 31, 1910.
974,370.
Patented Nov. 1, 1910.
3 SHEETS—SHEET 3.
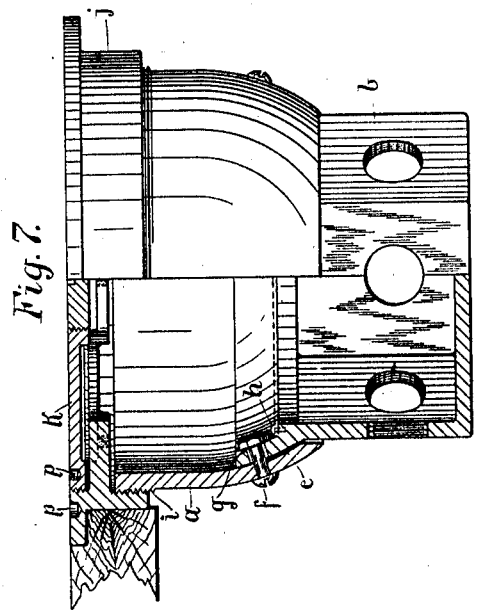
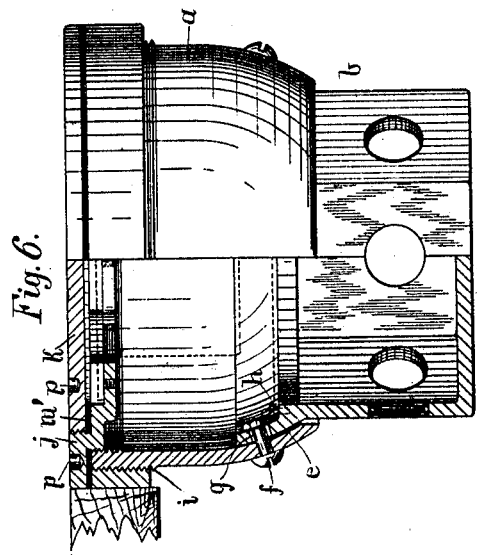
WITNESSES:
INVENTOR
John Fountain Jr.
BY
Fischer and Sanders.
ATTORNEYS.

UNITED STATES PATENT OFFICE.

JOHN FOUNTAIN, JR., OF ELIZABETH, NEW JERSEY.

UNIVERSAL FLOOR-BOX FOR THE DISTRIBUTION OF ELECTRIC WIRES.

974,370. Specification of Letters Patent. Patented Nov. 1, 1910.

Application filed June 24, 1904, Serial No. 213,932. Renewed March 31, 1910. Serial No. 552,632.

*To all whom it may concern:*

Be it known that I, JOHN FOUNTAIN, Jr., a citizen of the United States, and a resident of the city of Elizabeth, county of Union, and State of New Jersey, have invented certain new and useful Improvements in Universal Floor-Boxes for the Distribution of Electric Wires; and I do hereby declare that the following is a full, clear, and exact description of the same, reference being had to the accompanying drawings, and to the letters of reference marked thereon, which form a part of this specification.

My invention relates to an improved universal floor box to receive electric conduits and wires at the point at which they are brought into compartments of buildings on the floor level. This floor box is designed to receive any kind of a commercial receptacle on the market, such as for instance, electric light fixtures, switches, fuse-blocks, sockets or the like. The floor box is herein shown as embedded in a floor of a building, and it may be adapted for use in other location, as for instance, in the ceiling or wall of a room.

The object of my invention is to provide a universal floor box of this character, having two adjustable box body sections, said sections provided with universal spherical adjusting faces and means for firmly securing the sections in position when properly adjusted, said box being perfectly water tight and which may be adjusted readily and accurately to any construction or character of floor or wall, and which is readily accessible to permit renewal and repair of the socket or fuse plug or any other receptacle which may be contained in the floor box.

As shown in the drawings, Figure 1 is a sectional view of a floor box constructed in accordance with my invention, Fig. 2 is a side elevation of Fig. 1, Fig. 3 is a plan view, Fig. 4 is a sectional plan view of my floor box, taken on line $x$, $x$ in Fig. 1, Fig. 5 is a sectional view of a modified form of my improved floor box, Figs. 6 and 7 are side elevations, partially in vertical section, of modified forms of my improved floor box, Fig. 8 is a plan view of the adjustable cover, upon which the fuse block, switches or the like are mounted, Fig. 9 is a sectional elevation of the same.

The floor box proper consists of an upper and lower section lettered respectively $a$ and $b$. The upper section $a$ is preferably of cylindrical shape, and formed of cast iron, having a spherical termination $c$ which is designed to fit and conforms to the spherical projection $d$ of the lower box section $b$, which is preferably made polygonal. To make the box thoroughly water tight, I interpose a rubber gasket $e$ between the spherical extension $c$ of the upper section and the spherical projection $d$ of the lower section.

Bolts $f$ are passed through clearance holes $g$ in the upper and lower box sections and provided with nuts to firmly secure the sections in position when properly adjusted.

$h$ is an annular seat formed integral with the lower box section as in Figs. 6 and 7 and integral with the upper box section as in Figs. 1 and 5 to which a switch or fuse block can be fastened.

The upper box section $a$ is provided with an annular screw threaded flange $i$ for the reception of the adjustable screw threaded cover $j$. The screw threaded cover $j$ is provided with a screw threaded flange $o$ at its periphery and a recess $m$ in the upper side of the said cover for the reception of a cap.

The construction of the cover is very desirable in view of the fact that when a switch or fuse block is fastened to the said cover, and it is found necessary to make repairs on the switch or fuse block, it is only necessary to unscrew the cover to get at said switch or fuse block. The floor has an opening, which receives the floor box body and permits the cover $j$ to be screwed down onto the floor box so as to bring the upper surface of said cover level with the floor.

Both the cover $j$ and the supplemental cap $k$ are provided with holes $p$ for engagement therewith of a spanner wrench by which said cover or cap may be screwed into and out of place.

$k$ is a supplemental cap which has screw threaded engagement with the cover $j$ which is used when a box flush with the floor is desired.

When a receptacle with a plug is used the supplemental cap $k$ is removed and the projecting nozzle $q$ is substituted. To make the cover $j$ thoroughly water-tight, I interpose a rubber gasket $m'$ between the cover $j$ and the supplemental cap $k$, or as the case may be, between the cover $j$ and the projecting nozzle $q$.

$q$ represents a nozzle having screw threaded engagement with the cover $j$ and provided at its upper end with an insulating bush $j'$ for the passage of the conductors (not shown). The nozzle $q$ is provided with a hexagonal head $r$ for engagement therewith of a suitable implement, such as a wrench, by which said nozzle may be turned into and out of place. When this floor box of mine is to be used for holding a switch, fuse plug or similar article, which when placed in position in the box would necessarily project above the level of the cover $j$ the supplemental cap $k$ is removed and the nozzle $q$ is substituted.

I claim

1. A floor box having two adjustable box body sections, one section provided with an outwardly projecting flange, and the other with an inwardly projecting flange, said flanges being provided with bearing seats, whereby said box sections are capable of universal adjustment one upon the other upon said flanges.

2. A floor box having two adjustable box body sections, one section being polygonal and provided with an outwardly projecting flange and the other with an inwardly projecting flange, said flanges being provided with bearing seats, whereby said box sections are capable of universal adjustment one upon the other upon said flanges.

3. A floor box having two adjustable box body sections, one section being polygonal and provided with an outwardly projecting flange having openings in the lateral faces thereof, and the other with an inwardly projecting flange, said flanges being provided with bearing seats, whereby said box sections are capable of universal adjustment one upon the other upon said flanges.

4. A floor box having two adjustable box body sections, one section provided with an outwardly projecting flange, and an annular interior seat on said flange, and the other with an inwardly projecting flange, means for connecting said flanges, whereby said box sections are capable of universal adjustment one upon the other.

5. A floor box having two adjustable box body sections, one section being polygonal and provided with an outwardly projecting flange, and an annular interior seat on said flange, and the other with an inwardly projecting flange, means for connecting said flanges together whereby said box sections are capable of universal adjustment one upon the other.

6. A floor box having two adjustable box body sections, one section being polygonal and provided with an outwardly projecting flange and lateral faces having openings, and an annular interior seat on said flange, and the other with an inwardly projecting flange, means for connecting said flanges together whereby said box sections are capable of universal adjustment one upon the other.

7. A floor box having two adjustable box body sections, one section provided with an outwardly projecting flange and the other with an inwardly projecting flange and a screw threaded flange at its upper edge, and means for connecting said flanges together whereby said box sections are capable of universal adjustment one upon the other.

8. A floor box having two adjustable body sections, one section provided with an outwardly projecting flange and the other with an inwardly projecting flange, means for connecting said flanges together whereby said box sections are capable of universal adjustment one upon the other, a recessed cover provided with a screw threaded flange in its periphery, and a cap secured in the recess of said cover.

9. A floor box having two adjustable box body sections, one section provided with an outwardly projecting flange, and the other with an inwardly projecting flange, said box sections being capable of universal adjustment one upon the other, and means for firmly securing the flanges of said sections in position when properly adjusted.

10. A floor box having two box body sections, one section provided with an outwardly projecting flange and the other with an inwardly projecting flange, said box sections being capable of universal adjustment one upon the other, a gasket interposed between said box body flanges of said sections, and means for firmly securing the sections together in position when properly adjusted.

11. A floor box having two adjustable box body sections, one section provided with an inwardly projecting flange, and the other with an outwardly projecting flange, said box sections being capable of universal adjustment upon said flanges and means for securing the sections in position when properly adjusted.

12. A floor box having two adjustable box body sections, one section provided with an inwardly projecting flange, and the other with an outwardly projecting flange, said box sections being capable of universal adjustment upon said flanges, a gasket interposed between said box body sections, and means for securing the sections in position when properly adjusted.

13. A floor box having two adjustable box body sections, one section provided with an inwardly projecting flange, an annular interior seat on said flange, and the other with an outwardly projecting flange, said flanges being provided with bearing seats, whereby said box sections are capable of universal adjustment upon said flanges.

14. A floor box having two adjustable box body sections, said sections provided with flanges having universal spherical adjusting faces, and capable of universal adjustment upon said flanges.

15. A floor box having two adjustable box body sections, said sections provided with universal adjusting faces, capable of universal adjustment one upon the other, and means for firmly securing the sections in position when properly adjusted.

16. A floor box having two adjustable box body sections, said sections provided with universal spherical adjusting faces, capable of universal adjustment one upon the other, and means for firmly securing the sections in position when properly adjusted.

This specification signed and witnessed this 20th day of June 1904.

JOHN FOUNTAIN, Jr.

Witnesses:
 FREDK. C. FISCHER,
 LOUIS M. SANDERS.